Figure 1:
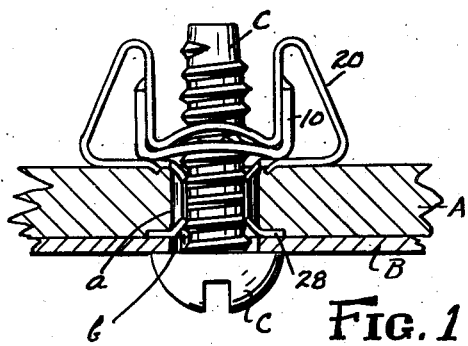

Aug. 27, 1946.    G. A. TINNERMAN    2,406,415
FASTENING DEVICE
Filed July 22, 1943

INVENTOR.
George A. Tinnerman
BY Bates, Teare & McBean,
Attorneys.

Patented Aug. 27, 1946

2,406,415

UNITED STATES PATENT OFFICE 2,406,415

FASTENING DEVICE

George A. Tinnerman, Cleveland, Ohio, assignor to Tinnerman Products, Inc., Cleveland, Ohio, a corporation of Ohio Application July 22, 1943, Serial No. 495,686

4 Claims. (Cl. 85—32)

This invention relates to a nut associated with means for attaching it in proper position to a support, so that it may be ready to receive the threaded shank of a screw bolt. More particularly, the nut is of the type made of sheet material having a bolt opening and deformed about the opening to engage the thread of the bolt, and the carrier for the nut is formed with a pair of spring arms adapted to occupy the bolt opening in the support and hold the nut in position to receive the bolt passing such opening. By this means I am able to mount nuts on the back of a support, not readily accessible to a wrench, in position to receive bolts or screws passed from the front into the nut.

My invention has a variety of uses, among which may be mentioned the securing of instruments to the instrument board of an airplane. In such case, the instrument board may be provided with proper openings to receive the instruments and with sets of my nut carriers and nuts mounted at the back of the board, so that the mere insertion of screws from the front will lock the positioned instrument in place. Various other uses will readily become apparent after the construction has been described.

The drawing illustrates different embodiments of my invention, employing the general principle of a nut of sheet material deformed about a bolt opening to make a thread-engager, and a pair of spring arms associated with the nut and having free end portions adapted to be pressed toward each other and then passed into an opening in the support, after which the natural resilience of the arms, spreading them, will lock the carrier to the support.

Figure 2:
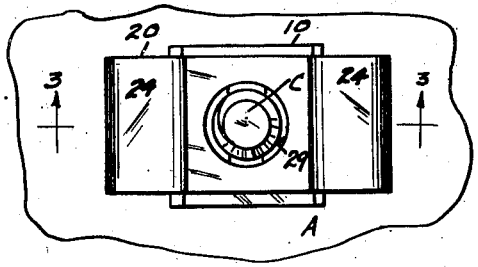
Figure 3:
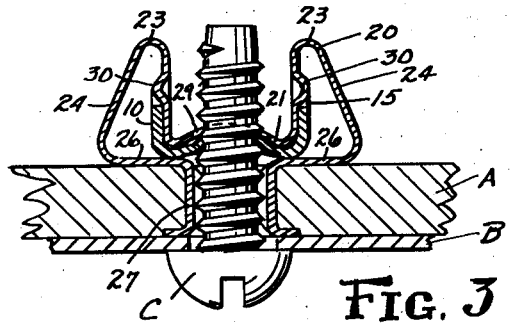
Figure 5:
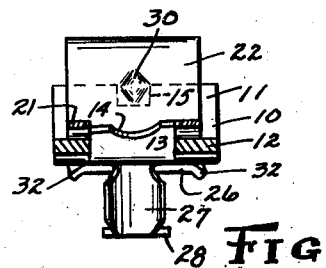
Figure 4:
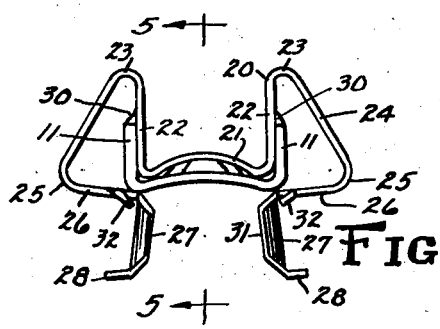
Figure 8:
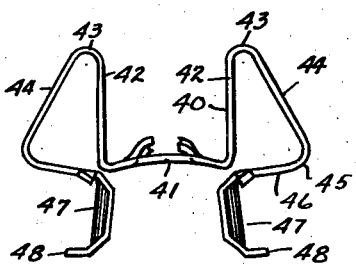
Figure 6:
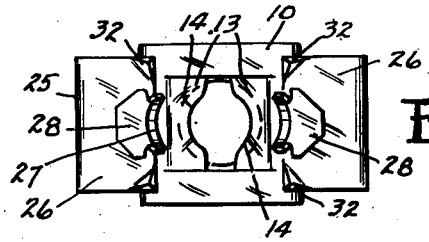
Figure 7A:
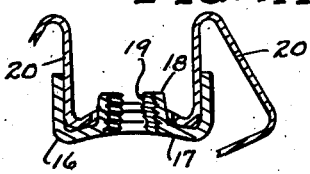
Figure 7:
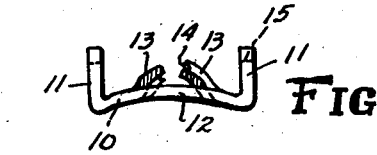

In the drawing, Fig. 1 is a side elevation of my fastening device in position on a support and in association with a plate and a screw passing into the nut of the fastener, the plate and support being in section; Fig. 2 is a plan view of the fastener shown in Fig. 1; Fig. 3 is a section of the construction of Fig. 1 in a plane parallel with Fig. 1, as indicated by the line 3—3 in Fig. 2; Fig. 4 is a side elevation of the fastening device removed from the support; Fig. 5 is a vertical section through the device, as indicated by the lines 5—5 in Fig. 4; Fig. 6 is a bottom plan view of the fastening device as shown in Fig. 4; Fig. 7 is a side elevation of the nut member itself removed from the carrying device, the plane of the elevation being substantially that of Fig. 4; Fig. 7—a is a fragmentary sectional side elevation of the carrier of Figs. 1 to 6, with a modified form of nut member; Fig. 8 is a side elevation similar to Fig. 4 but illustrating a modified form of the device.

Referring first to the embodiment illustrated in Figs. 1 to 7 inclusive, 10 indicates the nut member of the fastener, which is a strip of resilient sheet material preferably steel with its intermediate body portion slightly arched and its two end portions 11 bent up at right angles to a parallel position. Each upright end portion 11 is notched adjacent the center of its upper edge, as shown at 15, for a purpose to be described later.

A bolt opening 12 is formed through this intermediate portion and the material about the opening deformed to make a thread-engaging device. As shown in Fig. 7, the deformation comprises the provision of two integral tongues 13 partially severed from the body but anchored thereto at their distant ends, and bent upwardly therefrom in oppositely inclined directions. The ends of these tongues are recessed or notched as shown at 14, Fig. 6, and the end portions of the tongues are warped in opposite directions so that the walls of the notches define a helical turn adapted to engage the thread of the bolt.

In place of warping and notching the ends of the tongues to make a single turn thread-engager, as shown in Fig. 7, I may employ the form shown at 16 in Fig. 7—a where the tongues 17 have their end portions 18 bent approximately at right angles to the tongue body, which end portions are curved about the axis of the bolt opening and have internal inclined ribs 19, thus providing a plurality of helical threads to engage several turns of the bolt thread.

The nut carrier of Figs. 1 to 7 comprises a separate sheet member 20 of resilient metal bent into peculiar form so that it may be snugly embraced by the nut member and may provide spring arms adapted to interlock with a support. It is convenient to describe this member with reference to the drawing, as having upwardly and downwardly extending parts, but of course in actual use the so-called upwardly extending part may extend downwardly or horizontally, and so on.

As shown in the drawing, this carrier has an intermediate upwardly arched portion 21 from the ends of which two parallel regions 22 extend upwardly. At the upper ends of these regions are formed integral return bends 23 leading to downwardly extending outwardly flaring portions 24. From the lower end of each portion 24 a bend 25 leads to an inwardly extending portion 26 which then turns downwardly at 27 and finally outwardly at 28.

The nut member snugly embraces the intermediate portion of the carrier. That is to say, the arms 11 of the nut contact snugly with the exterior of the arms 22 of the carrier. Each arm 22 of the carrier is formed with an outward hump 30, preferably made by a depression on the inner face of the arm. This hump occupies the notch 15, previously mentioned, in the nut member, thereby preventing displacement of the nut member by movement in the direction of the faces of the arms 11 and 22. The inwardly extending portions 26 of the carrier lie beneath the nut member, as shown in Fig. 4, and thus normally retain it against the intermediate region 21 of the carrier. This intermediate region has a bolt opening 29, preferably somewhat larger than the opening 12 of the nut member, but registering with it.

The downwardly bent projecting arms 27 of the carrier are preferably bent at their ends toward the space between the arms as shown at 31, to give them a transverse concavo-convex form enabling them to fit snugly in a round hole in the support. The horizontal intermediate regions 26 of the carrier are each provided with downward prongs 32 which may readily embed themselves in the support to lock the carrier tightly in place and prevent its rotation when the bolt is turned in. These prongs are preferably four in number, one at each of the two inner corners of the two regions 26, as shown in Fig. 6.

In Figs. 1 and 3, A indicates a suitable flat support provided with an opening a. My nut carrier may be mounted on the support by pressing the free arms 27 (which normally flare, as shown in Fig. 4) toward each other sufficiently so that the outward ends 28 may be passed through the opening a; then the resilience of the material when released brings it into the position shown in Figs. 1 and 3, where the arms 27 occupy the opening and the end flanges 28 lie on one face of the support while the intermediate top portion 26 is on the opposite face of the support. In this position the nut member, which embraces the intermediate portion of the carrier, is firmly held in position between such intermediate portion 21 and the arms 26. The thread engaging tongues may project into the opening in the carrier, and in the form shown in Fig. 7—a may extend well through the opening.

In Figs. 1 and 3, B indicates a suitable member to be attached, which may, for instance, be the face plate of an instrument, and has an opening b adapted to register with the opening a. The character C in these figures indicates a threaded bolt having a head c. When the shank of such bolt is passed through the member B and between the arms 27 of the carrier, it finds its nut in the nut member 10, and, as the bolt is tightened, this nut member is stressed against the carrier arms 26 and thence against the inner face of the supporting panel A. At the same time the threaded shank of the bolt standing close to the arms 27 of the carrier insures these arms being maintained in position in the support.

It will be seen from the construction described that the carrier may be made of comparatively light gauge sheet metal bent on itself into the form shown and thus is adapted to hold a nut of proper dimensions in position in registration of the bolt opening in the support. By making the nut and its carrier separate members, as shown in Figs. 1 to 7, the carrier may be of materially thinner material than the nut, which saves metal in the carrier and allows its more ready formation, and at the same time allows the nut to be of proper thickness to resist the stresses put upon it in use.

In some installations where there is not much stressing of the nut it may be feasible without waste of material to make the nut and carrier as one integral member, as shown in Fig. 8. In this case the member 40, which comprises both the nut and the carrier, is shown as having the deformed intermediate region 41 of the same formation as the deformed intermediate region of the nut in Fig. 7; or, if desired, the intermediate portion may take the form of the nut shown in Fig. 7—a. The end arms of the nut portion correspond to the arms 11 in Fig. 7 or 16 in Fig. 7—a and also to the arms 22 of the carrier in Fig. 4. That is to say, the arms 42 extend upwardly from the nut portion 41 to the return bend 43, thence downwardly and outwardly at 44 and bending at 45 into the region 46, thence downwardly at 47 and outwardly at 48 in a similar manner to the carrier shown in Fig. 4.

In other words, in the construction of Fig. 8 the nut member is similar to that already described except that it is of lighter gauge and its upwardly extending arms become the arms of the carrier, which from that region to the extreme ends has the same formation as in the two-part device.

In the action of mounting an instrument there is some stressing of the intermediate region of the nut member (whether of the form of Fig. 4 or Fig. 8) by reason of the arched formation so that an axial pressure is obtained on the thread of the screw, thus continuously stressing the screw and providing an automatic lock preventing loosening of the screw. In the one embodiment of Fig. 8, an additional stressing results because when the legs 47 are sprung inwardly, such action raises the bridge member 41 and as the screw is turned in this member is not only somewhat flattened but is drawn down into contact with the inward portion 46 against the resistance provided by the arms 44. This puts an additional stress against the thread of the bolt, and is very effective in holding the bolt in place in light constructions.

My device may be cheaply constructed and may be readily mounted in place, the requisite number of the fasteners being located at the rear of a suitable panel support so that the instruments, or other members, may be mounted on such support without the necessity of access to the rear of the panel board. The prongs of the fastener, engaging the support, prevent any rotation of the fastener on the support as the bolt is screwed in, so that there is no necessity for a wrench. The instruments or other members may accordingly be secured on the support very quickly and at the same time very securely.

My fastening device has a wide variety of uses other than securing instruments to panels, as it may be advantageously employed in many installations where the position for a nut is not readily accessible, as will be readily understood. Use on instrument panels of airplanes, automotive vehicles, ships, etc., therefore, is only illustrative of intended uses. When used on instrument panels of an airplane the device may, if desired, be made of non-ferrous metal to avoid interference with an adjacent compass.

Reference is made to my divisional application No. 584,165, filed March 22, 1945, for claims relating to the single piece structure shown in Fig. 8.

I claim:

1. A fastening device comprising a member having an opening and deformed material about the opening to provide a thread-engager and a carrier for said member, formed with a pair of resilient arms extending away from the member and bent on themselves to extend backwardly in spaced relation to the first-mentioned extensions, said arms then extending inwardly toward the member and then away from the member to provide attaching legs, said legs being inwardly transversely concave, externally transversely convex to enable them to seat snugly in a round opening and to provide space between them for the passage of a bolt.

2. In a fastener, the combination of a nut member having an intermediate region with a bolt opening and the material about the opening deformed to provide thread-engaging means, the end portions being bent into substantial parallelism with each other, and a carrier member made of a single piece of resilient sheet material and having an intermediate region with an opening for the passage of a bolt and two substantially parallel extensions adapted to be embraced by the end portions of the nut member, the carrier member being then bent outwardly beyond the nut member and continuing backwardly and outward and then inwardly and then away from the nut member to provide fastening legs adapted to occupy an opening in a support and press outward resiliently against the wall of the opening, the ends of said legs being flanged outwardly so that the support may extend between the flanges and the inwardly bent regions carrying the legs and be embraced thereby, the arms of the carrier which lead from the intermediate region being provided with outward projections and the parallel arms of the nut member being provided with notches in their ends adapted to be occupied by such projections.

3. A fastening device comprising in combination a nut member having an opening and upwardly deformed material about the opening to provide a thread-engager and having upwardly extending end flanges, and a carrier for the nut member made of a separate piece of resilient sheet metal and having an upwardly bowed intermediate region nesting with the nut member and having portions embraced by said end flanges and formed with a pair of projecting arms adapted to extend through an opening in a support to hold the nut member in position.

4. In a fastener, the combination of a nut member having an intermediate region with a bolt opening and the material about the opening deformed to provide stud-engaging means, the end portions of the nut member being bent in the same general direction, and a carrier member made of a single sheet of resilient sheet material and having an intermediate region with an opening for the passage of a bolt and two extensions substantially parallel with those of the nut member, said carrier extensions being then bent outwardly and extending backwardly in spaced regulation to their first extensions and then inwardly and then away from the nut member to provide fastening legs adapted to occupy an opening in a support, the portions of the carrier which lead from the intermediate region being in engagement with the end portions of the nut, and one of them being provided with projections and the other with openings adapted to be occupied by such projections.

GEORGE A. TINNERMAN.